(No Model.)
P. J. HARRAH.
THILL SUPPORT.
No. 455,204. Patented June 30, 1891.
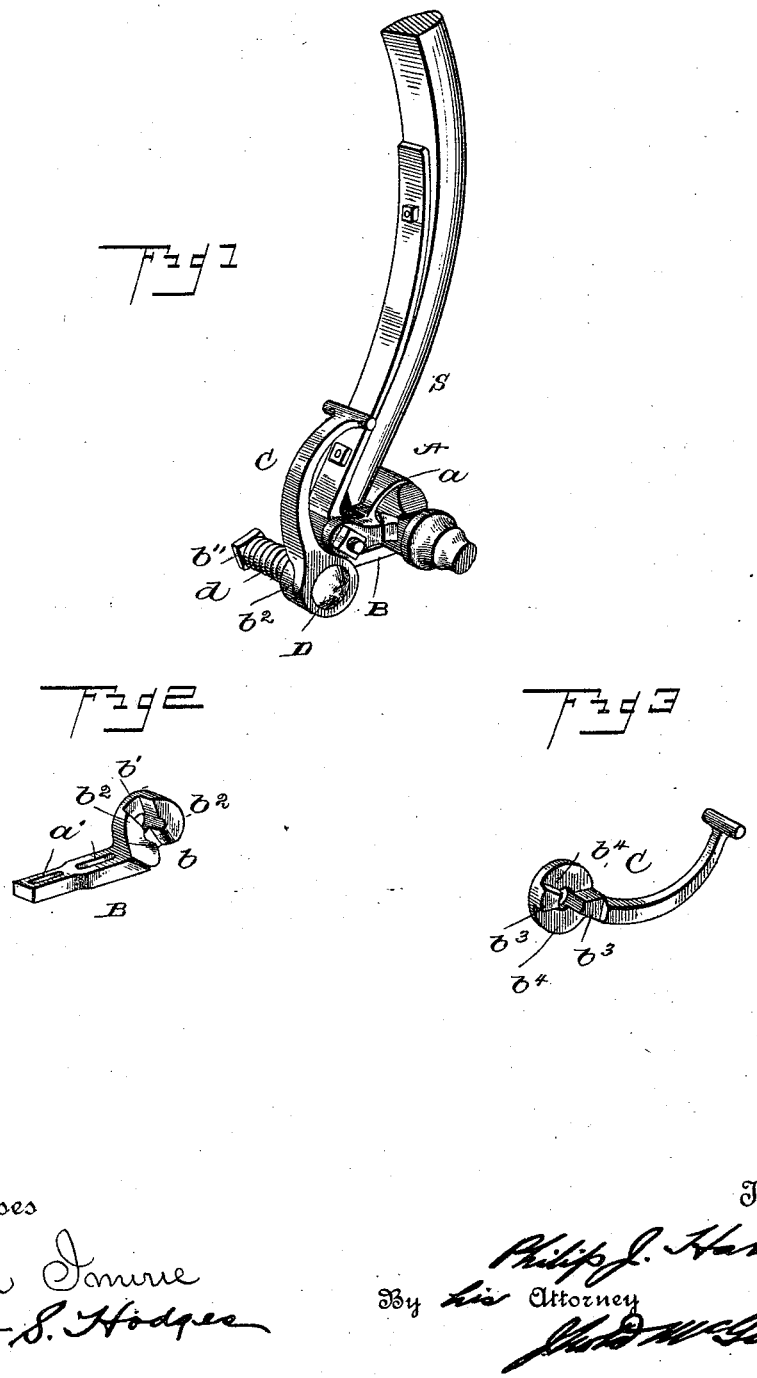
Witnesses
Inventor
Philip J. Harrah,
By his Attorney

UNITED STATES PATENT OFFICE.

PHILIP J. HARRAH, OF BLOOMFIELD, INDIANA, ASSIGNOR TO SAMUEL W. AXTELL.

THILL-SUPPORT.

SPECIFICATION forming part of Letters Patent No. 455,204, dated June 30, 1891.

Application filed April 4, 1891. Serial No. 387,685. (No model.)

*To all whom it may concern:*

Be it known that I, PHILIP J. HARRAH, a citizen of the United States of America, residing at Bloomfield, in the county of Greene and State of Indiana, have invented certain new and useful Improvements in Shaft-Holders, of which the following is a specification, reference being had therein to the accompanying drawings.

This invention pertains to shaft-holders, having for its object the production of cheap, simple, and highly efficient means by which a clip can be readily secured to an axle, a shaft or shafts held elevated when not in use, and rattling of the thill-iron or coupling is prevented.

The invention comprises an axle-clip having its yoke or connecting-bar extended and provided with a cam end, and a spring-held arm, also having a cam end engaging said former cam end and bearing at its outer end against the under side of a thill-iron or shaft.

The invention also comprises the detail construction, combination, and arrangement of parts, substantially as hereinafter fully set forth, and particularly pointed out in the claims.

In the accompanying drawings, Figure 1 is a view in perspective illustrative of my invention. Fig. 2 is a detail view of the clip yoke or bar. Fig. 3 is a view of the holding-arm.

Referring to the drawings, A designates a thill-coupling of any ordinary or preferred form, having a clip $a$, which encircles an axle, as generally employed.

B is the yoke or bar for connecting the depending reduced ends of clip $a$, said bar being provided with slots $a'$, through which said ends are projected, and thus the clip and its yoke or bar can be applied to different-size axles. This yoke or bar B is provided with an outer cam end $b$, which consists of two grooves or recesses $b'$ and two inclined lugs or flanges $b^2$.

C is a curved arm having an outer T end designed to normally bear against the under side of a thill-iron or shaft S. The inner end of this arm corresponds with the cam end $b$ of yoke or bar B, and is likewise provided with two inclined lugs or flanges $b^3$ and intermediate grooves or recesses $b^4$.

D is a bolt, which is passed through coincident holes or apertures in the cam ends of yoke or bar B and arm C, said bolt being provided with an encircling spring $d$, which is held tight against the cam end $b$ by a nut $b'$, screwed on said bolt, the headed end of the latter being held tight against the outer side of the cam end of arm C. In Fig. 1 the arm C is shown elevated, and so holding a shaft, its inner cam end being held locked or in engagement with the corresponding end of the yoke or bar B by the spring-held pivot-bolt. By bearing down on the shaft the arm C turns on its pivot and forces the cam ends unlocked as against the action of the spring on the bolt. When in this position, all rattling of the thill is prevented. Thus it will be seen that the arm is always in contact with the shaft and serves a twofold purpose—namely, to hold said shaft elevated when not in use and to prevent rattling thereof when the vehicle is being used. Thus it will be seen that by forming the yoke or bar of the ordinary clip with a locking cam end there is a great saving or economy in construction, the device being thereby greatly simplified and the cost thereof reduced.

The invention is extremely simple, and being composed of but few parts is not liable to readily get out of order or be deranged.

I claim as my invention—

1. The herein-described improved shaft-holder, comprising the bar having an outer cam end, and the arm having an inner corresponding cam end designed to engage with said former cam end, its outer end bearing against the under side of a shaft, as set forth.

2. The herein-described improved shaft-holder, comprising the bar having an outer cam end, the arm having a corresponding cam end engaging therewith, and the spring-pressed bolt passed through said cam ends, as set forth.

3. The herein-described improved shaft-holder, comprising the yoke or bar having an outer end provided with inclined lugs or flanges, the arm also having inclined lugs or flanges at its inner end, said bar and arm being provided with coincident holes or apertures, the pivot-bolt passed through said holes or apertures, and the spring secured thereon bearing against said yoke or bar, substantially as set forth.

4. The herein-described improved shaft-holder, comprising the clip having reduced ends, the yoke or bar having slots through which said ends are passed and also having an outer cam end, the curved arm having an inner cam end engaging with said former cam end, and the spring-pressed pivot-bolt passed through coincident holes or apertures of said cam ends, substantially as and for the purposes stated.

In testimony whereof I affix my signature in presence of two witnesses.

PHILIP J. HARRAH.

Witnesses:
JAMES HARREL.
OTTO F. HEROLD.